(12) United States Patent
Im et al.

(10) Patent No.: US 11,106,942 B2
(45) Date of Patent: Aug. 31, 2021

(54) METHOD AND APPARATUS FOR GENERATING LEARNING DATA REQUIRED TO LEARN ANIMATION CHARACTERS BASED ON DEEP LEARNING

(71) Applicant: ELECTRONICS AND TELECOMMUNICATIONS RESEARCH INSTITUTE, Daejeon (KR)

(72) Inventors: Dong Hyuck Im, Daejeon (KR); Jung Hyun Kim, Daejeon (KR); Hye Mi Kim, Daejeon (KR); Jee Hyun Park, Daejeon (KR); Yong Seok Seo, Daejeon (KR); Won Young Yoo, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 65 days.

(21) Appl. No.: 16/696,354

(22) Filed: Nov. 26, 2019

(65) Prior Publication Data
US 2021/0103721 A1 Apr. 8, 2021

(30) Foreign Application Priority Data
Oct. 8, 2019 (KR) .......................... 10-2019-0124592

(51) Int. Cl.
*G06K 9/62* (2006.01)
*G06K 9/00* (2006.01)
(Continued)

(52) U.S. Cl.
CPC ....... *G06K 9/6259* (2013.01); *G06K 9/00362* (2013.01); *G06K 9/00718* (2013.01);
(Continued)

(58) Field of Classification Search
CPC ............ G06K 9/6259; G06K 9/00718; G06K 9/6218; G06K 9/42; G06K 9/625;
(Continued)

(56) References Cited

U.S. PATENT DOCUMENTS

| 2006/0170769 A1* | 8/2006 | Zhou ................ G08B 13/19613 348/143 |
| 2013/0202200 A1* | 8/2013 | Ribnick ............... G06K 9/6221 382/160 |

(Continued)

FOREIGN PATENT DOCUMENTS

| KR | 1020180089132 A | 8/2018 |
| KR | 1020180092494 A | 8/2018 |

OTHER PUBLICATIONS

Somandepalli et al., "Unsupervised Discovery of Character Dictionaries in Animation Movies", IEEE Transactions on Multimedia, Mar. 2018, pp. 539-550, vol. 20, No. 3, IEEE.

*Primary Examiner* — Casey L Kretzer (57) ABSTRACT

Disclosed are a learning data generation method and apparatus needed to learn animation characters on the basis of deep learning. The learning data generation method needed to learn animation characters on the basis of deep learning may include collecting various images from an external source using wired/wireless communication, acquiring character images from the collected images using a character detection module, clustering the acquired character images, selecting learning data from among the clustered images, and inputting the selected learning data to an artificial neural network for character recognition.

16 Claims, 8 Drawing Sheets

(51) Int. Cl.
  *G06K 9/20*  (2006.01)
  *G06K 9/42*  (2006.01)
  *G06N 20/00*  (2019.01)

(52) U.S. Cl.
  CPC ....... *G06K 9/00744* (2013.01); *G06K 9/2054* (2013.01); *G06K 9/42* (2013.01); *G06K 9/6218* (2013.01); *G06K 9/6253* (2013.01); *G06K 9/6257* (2013.01); *G06N 20/00* (2019.01)

(58) Field of Classification Search
  CPC ............. G06K 9/00362; G06K 9/2054; G06K 9/6253; G06K 9/00744; G06N 20/00
  See application file for complete search history.

(56) References Cited

U.S. PATENT DOCUMENTS

| | | | |
|---|---|---|---|
| 2016/0232428 A1* | 8/2016 | Engstrom | G06K 9/52 |
| 2017/0034018 A1* | 2/2017 | Parandehgheibi | G06F 16/285 |
| 2018/0033463 A1* | 2/2018 | Lee | G11B 27/28 |
| 2018/0123797 A1 | 5/2018 | Noh et al. | |
| 2018/0232606 A1 | 8/2018 | Park et al. | |
| 2018/0253596 A1* | 9/2018 | Barman | G06K 9/00369 |
| 2019/0026605 A1 | 1/2019 | Hong | |
| 2019/0034793 A1 | 1/2019 | Kataria et al. | |
| 2021/0056313 A1* | 2/2021 | Nir | G06K 9/626 |

\* cited by examiner

METHOD AND APPARATUS FOR GENERATING LEARNING DATA REQUIRED TO LEARN ANIMATION CHARACTERS BASED ON DEEP LEARNING

CLAIM FOR PRIORITY

This application claims priority to Korean Patent Application No. 10-2019-0124592 filed on Oct. 8, 2019 in the Korean Intellectual Property Office (KIPO), the entire contents of which are hereby incorporated by reference.

BACKGROUND

1. Technical Field

Example embodiments of the present invention relate in general to a method and apparatus for generating learning data required to learn animation characters based on deep learning and more specifically to a technique for providing learning data according to usage and improving a character recognition rate through the provided learning data by accurately selectively generating learning data for animation characters to be learned through a user-deep-learning-based artificial neural network.

2. Related Art

An object detection technique is a key technique that is widely used in many applications such as robots, video surveillance, vehicle safety, and the like. Recently, a deep learning-based object detection method using an artificial neural network or a convolutional neural network (CNN) is becoming known as an object detection technique, and thus object detection performance is dramatically improving.

A typical neural network used for deep learning is a multilayer perceptron having a plurality of hidden layers placed between an input layer and an output layer. An artificial neural network may be implemented in hardware but is mainly implemented using software and is in the form in which several neurons, which are basic computing units, are connected to one another through a weighted link. Accordingly, a weight is adjusted according to given learning data.

Deep-learning-based object detection using such an artificial neural network requires a large amount of learning data to guarantee satisfactory detection performance. At present, since people manually collect, classify, and input a variety of pieces of image data as learning data, it is difficult and expensive to collect the learning data.

In particular, an object such as an animation character has high diversity, and thus a target on which object detection is to be performed varies depending on the conditions. In this case, there is a problem in that a user must collect and refine an image suitable for being learned whenever the conditions are changed.

SUMMARY

Accordingly, example embodiments of the present invention are provided to substantially obviate one or more problems due to limitations and disadvantages of the related art.

Example embodiments of the present invention provide a learning data generation method needed to learn animation characters on the basis of deep learning.

Example embodiments of the present invention also provide a learning data generation apparatus needed to learn animation characters on the basis of deep learning.

In some example embodiments, the present invention provides a learning data generation method needed to learn animation characters on the basis of deep learning.

The learning data generation method needed to learn animation characters on the basis of deep learning may include collecting various images from an external source using wired/wireless communication, acquiring character images from the collected images using a character detection module, clustering the acquired character images, selecting learning data from among the clustered images, and inputting the selected learning data to an artificial neural network for character recognition.

The collecting of the various images may include collecting a video from the external source using the wired/wireless communication and extracting frames from the collected video at preset time intervals.

The learning data generation method may further include training the character detection module using the collected images after the collecting of the various images.

The training of the character detection module may include labeling the collected images to generate labels corresponding to the respective images and inputting the generated labels and the collected images to a preset character detection model to train the character detection model.

Each of the labels may be a label conforming to DarkNet format and may include a class number, a start point coordinate ratio of a bounding box, and an aspect ratio of the bounding box.

The acquiring of the character images may include detecting a bounding-box-shaped character region from each of the collected images using the character detection model and preprocessing the detected character region to acquire the corresponding character image.

The preprocessing may include cutting the character region out of the corresponding collected image and normalizing the size of the cut character region.

The clustering may include extracting a feature vector from the character image and clustering the character image using the extracted feature vector.

The clustering of the character image using the extracted feature vector may include clustering the character image, adjusting a cluster determination strength value according to the number of clusters generated by the clustering, and re-clustering the character image.

The adjusting of the cluster determination strength value may include increasing the cluster determination strength value when the number of clusters exceeds a maximal limit value within a preset limit range and decreasing the cluster determination strength value when the number of clusters is less than an initial limit value within the limit range.

In other example embodiments, the present invention provides a learning data generation apparatus needed to learn animation characters on the basis of deep learning.

The learning data generation apparatus needed to learn animation characters on the basis of deep learning may include at least one processor and a memory configured to store instructions for instructing the at least one processor to perform at least one operation.

The at least one operation may include collecting various images from an external source using wired/wireless communication, acquiring character images from the collected images using a character detection module, clustering the acquired character images, selecting learning data from among the clustered images, and inputting the selected learning data to an artificial neural network for character recognition.

The collecting of the various images may include collecting a video from the external source using the wired/wireless communication and extracting frames from the collected video at preset time intervals.

The at least one operation may further include training the character detection module using the collected images after the collecting of the various images.

The training of the character detection module may include labeling the collected images to generate labels corresponding to the respective images and inputting the generated labels and the collected images to a preset character detection model to train the character detection model.

The character detection model may be one of You-Only-Look-Once (YOLO), Single Shot Detector (SSD), and Faster R-convolutional neural network (CNN).

Each of the labels may be a label conforming to DarkNet format and may include a class number, a start point coordinate ratio of a bounding box, and an aspect ratio of the bounding box.

The acquiring of the character images may include detecting a bounding-box-shaped character region from each of the collected images using the character detection model and preprocessing the detected character region to acquire the corresponding character image.

The preprocessing may include cutting the character region out of the corresponding collected image and normalizing the size of the cut character region.

The clustering may include extracting a feature vector from the character image and clustering the character image using the extracted feature vector.

The selecting of the learning data may include displaying, to a user, representative images for a plurality of clusters to which the clustered image belongs and selecting, as the learning data, a character image belonging to a cluster corresponding to an image selected by the user from among the displayed representative images.

BRIEF DESCRIPTION OF DRAWINGS

Example embodiments of the present invention will become more apparent by describing example embodiments of the present invention in detail with reference to the accompanying drawings, in which.

DESCRIPTION OF EXAMPLE EMBODIMENTS

While the invention is susceptible to various modifications and alternative forms, specific embodiments thereof are shown by way of example in the drawings and will be described in detail herein. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments of the present invention will be described below in more detail with reference to the accompanying drawings.

Figure 1:
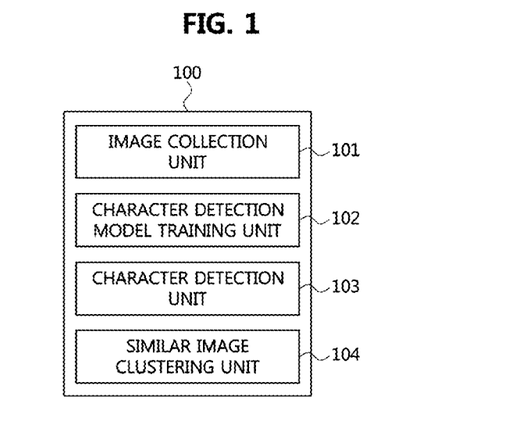
FIG. 1 is a block diagram functionally showing a learning data generation apparatus needed to learn animation characters on the basis of deep learning according to an embodiment of the present invention.

FIG. 1 is a block diagram functionally showing a learning data generation apparatus needed to learn animation characters on the basis of deep learning according to an embodiment of the present invention.

Referring to FIG. 1, a learning data generation apparatus 100 needed to learn animation characters on the basis of deep learning may include an image collection unit 101, a character detection model training unit 102, a character detection unit 103, and/or a similar image clustering unit 104.

The image collection unit 101 may search for an image corresponding to a character name entered from a user through a website or the like and may store a found image. In this case, a collected image may include various kinds of videos as well as two-dimensional (2D) and three-dimensional (3D) images.

The character detection model training unit 102 may train a character detection model by inputting a label including an image stored in the image collection unit 101 and information regarding a character position in an image to the character detection model. In this case, as the character detection model, a predetermined deep-learning-based objection detection model (which is also referred to as an object detection algorithm having an artificial neural network) may be used as the character detection model. For example, You-Only-Look-Once (YOLO), Single Shot Detector (SSD), Faster R-convolutional neural network (CNN), or the like may be used.

The character detection unit 103 may extract a region including a character (hereinafter also referred to as a character image) from an image stored through the image collection unit 101 using the character detection model trained by the character detection model training unit 102 and then store the extracted region.

The similar image clustering unit 104 may classify similar characters in a character image using a clustering algorithm. Here, the character image on which the classification is performed may be used as deep learning-based character learning data.

Figure 2:
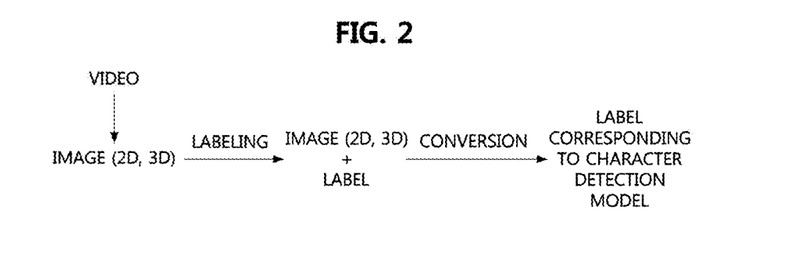
FIG. 2 is a conceptual diagram illustrating a process of training a character detection model according to an embodiment of the present invention.

FIG. 2 is a conceptual diagram illustrating a process of training a character detection model according to an embodiment of the present invention.

Referring to FIG. 2, in order to train the character detection model shown in FIG. 1, it is necessary to generate input data from variously collected images according to the character detection model. In this case, when data collected by the image collection unit 101 shown in FIG. 1 through a website or the like is a video, an image (or a still picture) may be acquired by extracting each frame of the video at predetermined time intervals or by capturing the video at certain time intervals.

Through a labeling process, a collected image may be assigned with a label corresponding to the image. Here, the label is meta-information regarding the collected image and may include a class number, a bounding box size, and the like. In this case, the label may be set differently according to various annotation formats. For example, the annotation formats may include PASCAL VOC format, DarkNet format, and the like. In this case, when YOLO is used as the character detection model, DarkNet format may be used.

Here, a label conforming to DarkNet format may include a class number, a start point coordinate ratio of a bounding box, and an aspect ratio.

In the labeling process, when a corresponding label is not compatible with the character detection model, a process of converting an annotation format into a label corresponding to the character detection model may be additionally performed. For example, when the character detection model is YOLO and the label of the collected image is VOC format, the label may be converted into DarkNet format.

In summary, through the above processes, a collected image and a label corresponding to the image are input to a predetermined character detection model to train the character detection model. The character detection model trained in this way may extract a character region from various kinds of input images.

Figure 3:
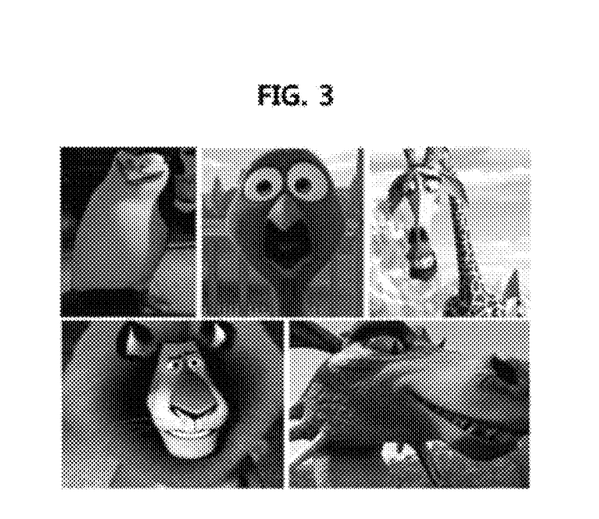
FIG. 3 is an exemplary diagram showing a result of extracting a character image using a character detection model according to an embodiment of the present invention.

FIG. 3 is an exemplary diagram showing a result of extracting a character image using a character detection model according to an embodiment of the present invention.

Referring to FIG. 3, when an image is collected in various ways, the image may include not only a character but also a background, an object, and the like. Accordingly, only character regions necessary for learning may be extracted using the character detection model with reference to the descriptions of FIGS. 1 and 2.

Figure 4:
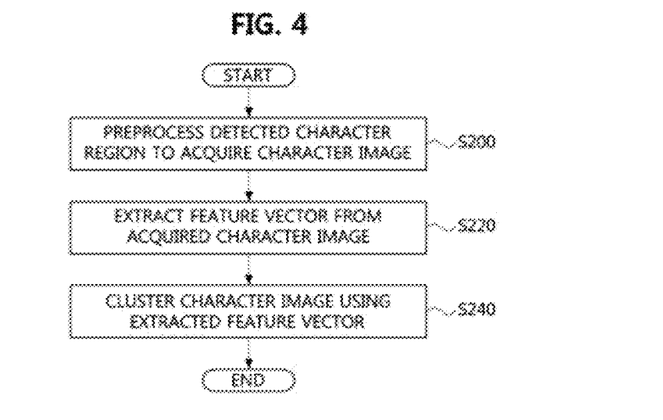
FIG. 4 is a flowchart illustrating a process of performing clustering using an extracted character image according to an embodiment of the present invention.

FIG. 4 is a flowchart illustrating a process of performing clustering using an extracted character image according to an embodiment of the present invention.

Referring to FIG. 4, the character detection model may detect a character region from an image (in the form of a bounding box). Thus, the character detection model may preprocess the detected character region to acquire a character image (S200). Here, the preprocessing may include a process of cutting a character region detected through the character detection module from a collected image and normalizing the size of the cut character region.

As a detailed example, referring to FIG. 3, character images may be confirmed that are obtained by extracting only a region including an animation character from a collected image in various ways.

When a character image is acquired, a feature vector may be extracted from the acquired character image (S220). Here, GIST descriptor may be used as an algorithm for extracting a feature vector from an image. In addition, deep learning-based artificial neural networks may be used. For example, a feature vector may be extracted using AlexNet, ResNet, DenseNet, and the like. A result of deriving the performance of extracting feature vectors experimentally may show that the same characters are grouped from the most scenes by DenseNet (162 layers), then by ResNet (152 layers), and finally by AlexNet (18 layers). Accordingly, more preferably, a feature vector may be extracted using DenseNet.

Subsequently, a character image may be clustered using the extracted feature vector (S240). Since the number of subclasses (or clusters) of a character detected from a collected image cannot be predicted, it may be desirable not to use an algorithm that needs to set the number of clusters in advance among clustering algorithms. In other words, since the feature vector differs depending on the character, the number of subclasses of the character cannot be predicted. Accordingly, it may be desirable to apply a clustering algorithm with no limitation on the number of clusters.

Also, it may be desirable to apply an algorithm that provides a representative image for each cluster after the clustering is complete so that a worker may easily determine whether to use character images included in a specific cluster as learning data.

Accordingly, a representative K-means clustering algorithm among clustering algorithms used for conventional statistics and data mining may be inappropriate because it is necessary to set the number of clusters in advance.

Affinity Propagation (AP) may be used as the clustering algorithm according to an embodiment of the present invention. Clustering using AP may be performed by determining various ranges according to the similarity of input data and choosing representative data within a determined range. In detail, clustering using AP continuously calculates responsibility (r) and availability (a) for all data and updates the calculation result until the clustering ends by a preset criterion. Here, the reliability (r) and the availability (a) may be repeatedly calculated using Equation 1 below:

$$\forall i, k: r(i, k) = s(i, k) - \max_{k', k' \neq k} [s(i, k') + a(i, k')]$$ [Equation 1]

$$\forall i, k: a(i, k) =$$
$$\begin{cases} \sum_{i', i' \neq i} \max[0, r(i', k)], \text{ for } k = i \\ \min[0, r(k, k) + \sum_{i', i' \neq (i,k)} \max[0, r(i', k)], \text{ for } k \neq i \end{cases}$$

where s(i,k) may be a similarity between $i^{th}$ data and $k^{th}$ data, r(i,k) is reliability when $k^{th}$ data is representative data for $i^{th}$ data, and a(i,k) is availability when $i^{th}$ data indicates selection of $k^{th}$ data as representative data. In this case, the similarity may be defined using Equation 2 below:

$$s(i,k) = -\|x_i - x_k\|^2$$ [Equation 2]

where the similarity s(i,k) may be a value obtained by taking a negative sign on the square of the norm operation (or Euclidean norm) on $i^{th}$ data $x_i$ and $k^{th}$ data $x_k$.

When the reliability and availability calculated according to Equation 1 no longer change and converge to specific values, the computation process for the clustering ends. When the computation process ends, representative data ĉ corresponding to Equation 3 below may be output as clustering result data.

$$ĉ=(ĉ_1, \ldots, ĉ_N), ĉ_i = \text{argmax}_k[a(i,k) + r(i,k)]$$ [Equation 3]

Referring to Equation 3 above, data that maximizes the sum of the reliability (r) and the availability (a) may be output as representative data. In other words, the representative image may be output.

In the case of conventional clustering using an AP algorithm, errors such as noise clustering or over-clustering may occur. The noise clustering and the over-clustering will be described in detail with reference to FIGS. 5 and 6.

Figure 5:
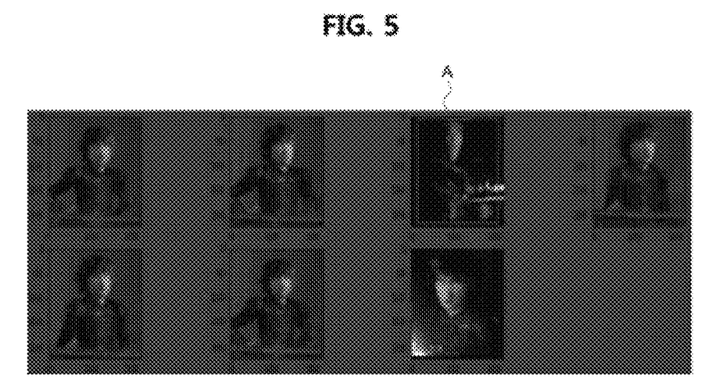
FIG. 5 is an exemplary diagram showing a result of noise clustering that occurs during conventional clustering using an Affinity Propagation (AP) algorithm.

FIG. 5 is an exemplary diagram showing a result of noise clustering that occurs during conventional clustering using the AP algorithm.

Referring to FIG. 5, the noise clustering may be an error in which different character images are classified into the same cluster after clustering.

In the conventional clustering using the AP algorithm, as a result of performing the clustering, a noise clustering error occurs in which a different type of character image, such as A, is also classified into a cluster into which a specific character image has been classified.

Figure 6:
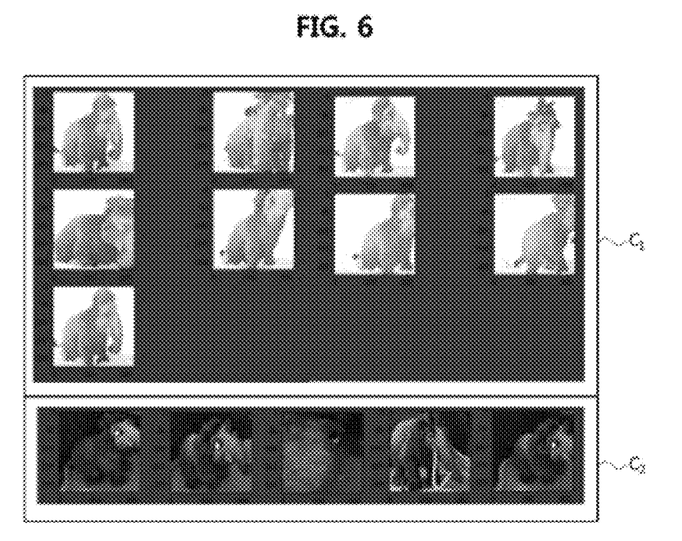
FIG. 6 is an exemplary diagram showing a result of over-clustering that occurs during conventional clustering using the AP algorithm.

FIG. 6 is an exemplary diagram showing a result of over-clustering that occurs during the conventional clustering using the AP algorithm.

Referring to FIG. 6, the over-clustering is an error that occurs due to excessive cluster segmentation during clustering. In this case, even the same character may be classified into different clusters such as C1 and C2 due to an external factor. Here, the external factor may be at least one of posture, lighting, and the like.

The conventional clustering using the AP algorithm has a disadvantage of low precision due to occurrence of an over-clustering error in which the same character images are classified into different clusters.

Thus, the learning data generation apparatus according to an embodiment of the present invention may prevent occurrence of errors such as noise clustering and over-clustering by adjusting a cluster determination strength value when the clustering using the AP algorithm is performed. A method of adjusting the determination strength value of the cluster will be described in more detail with reference to FIG. 7.

Figure 7:
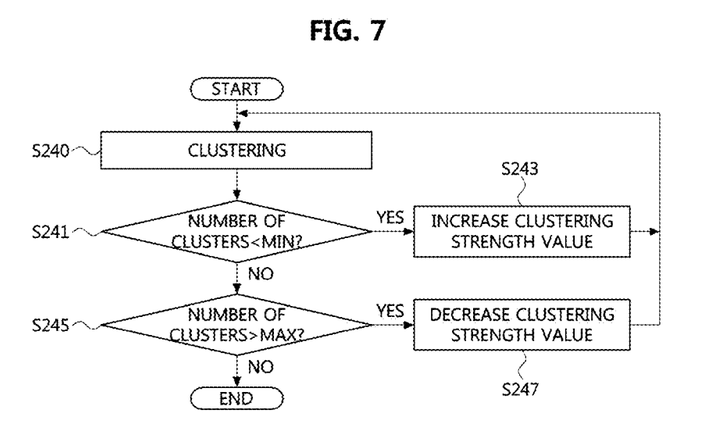
FIG. 7 is a flowchart illustrating a process of adjusting a cluster determination strength value according to an embodiment of the present invention.

FIG. 7 is a flowchart illustrating a process of adjusting a cluster determination strength value according to an embodiment of the present invention.

Referring to FIG. 7, the cluster determination strength value may be a reference value for clustering a character image into one cluster. In other words, the cluster determination strength value may be a reference for determining whether character images correspond to the same cluster on the basis of a similarity calculated between the character images. For example, when a similarity between a plurality of character images is higher than the cluster determination strength value, the character images may be classified into the same cluster.

According to an embodiment, the cluster determination strength value may adjust the number of clusters generated according to the clustering S240 in FIG. 4 to fall within a preset limit range.

In more detail, the cluster determination strength value may compare the number of clusters generated by initial clustering to the preset limit range. Here, in order to perform high-precision clustering, the limit range may define the number of generated clusters to a limited range, that is, to a range between an initial limit value and a maximal limit value.

According to an embodiment, when the number of clusters generated by clustering of a character image is less than a minimal limit value (S241), the learning data generation apparatus may increase the cluster determination strength value (S243). Subsequently, the learning data generation apparatus may re-perform clustering (S240). Accordingly, the learning data generation apparatus may increase the final number of clusters by combining only character images having a higher similarity than that in the previous stage with the same cluster. Accordingly, the above operations may be repeatedly performed until the number of clusters generated by the clustering of the character image falls within the limit range.

According to another embodiment, when the number of clusters generated by the clustering of the character image exceeds the maximum value within the limit range (S245), the learning data generation apparatus may decrease the cluster determination strength value (S247). Subsequently, the learning data generation apparatus may re-perform clustering (S240).

The learning data generation apparatus may decrease the final number of clusters by combining only character images having a low similarity to the same cluster while re-performing the clustering (S240). Subsequently, the above operations may be repeatedly performed until the number of clusters generated by the clustering of the character image falls within the limit range.

The learning data generation apparatus according to an embodiment of the present invention may enable high-precision clustering by adjusting the number of clusters of the character images generated through the clustering to fall within a preset limit range according to the cluster determination strength value.

Figure 8:
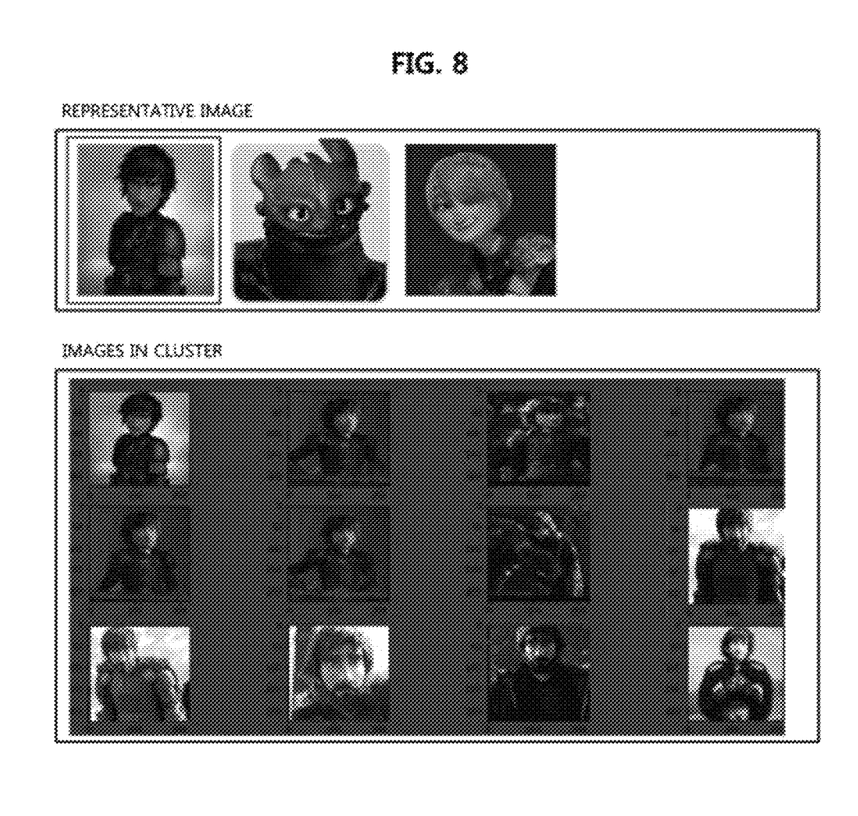
FIG. 8 is an exemplary diagram showing a result of clustering a character image according to an embodiment of the present invention.

FIG. 8 is an exemplary diagram showing a result of clustering a character image according to an embodiment of the present invention.

Referring to FIG. 8, the learning data generation apparatus according to an embodiment of the present invention may confirm that the same character images are classified into the same cluster without being affected by an image background or a character posture.

Figure 9:
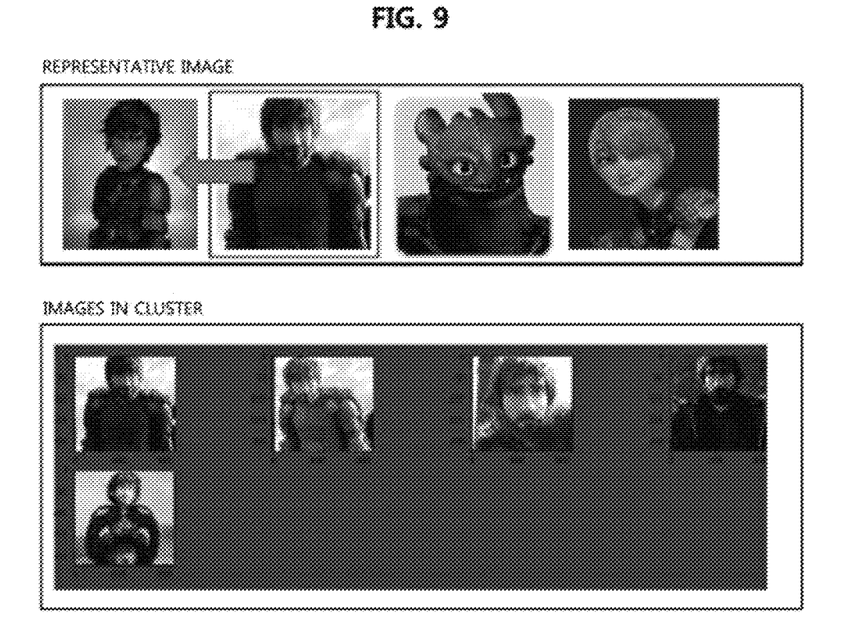
FIG. 9 is an exemplary diagram illustrating cluster utilization based on a user interface according to an embodiment of the present invention.

FIG. 9 is an exemplary diagram illustrating cluster utilization based on a user interface according to an embodiment of the present invention.

Referring to FIGS. 8 and 9, the learning data generation apparatus according to an embodiment of the present invention may provide a user interface (UI). Thus, after the clustering is complete, a user may generate a learning dataset by selecting and manipulating a representative image of a cluster.

In detail, as shown in FIG. 8, according to an embodiment, by selecting any one representative image from among representative images of clusters, a user may set a plurality of images included in a cluster to which the representative image belongs as a learning dataset for deep learning-based animation character learning.

Also, the learning data generation apparatus may integrate a plurality of clusters into one cluster by selecting and manipulating a representative image of a cluster.

According to an embodiment, when the same character images are classified into a plurality of clusters, as shown in FIG. 9, a user selects the representative image of a cluster into which one of the same character images is classified to drag and drop the selected representative image toward the representative image of another cluster. Thus, the same character images classified into different clusters may be integrated into one cluster.

Figure 10:
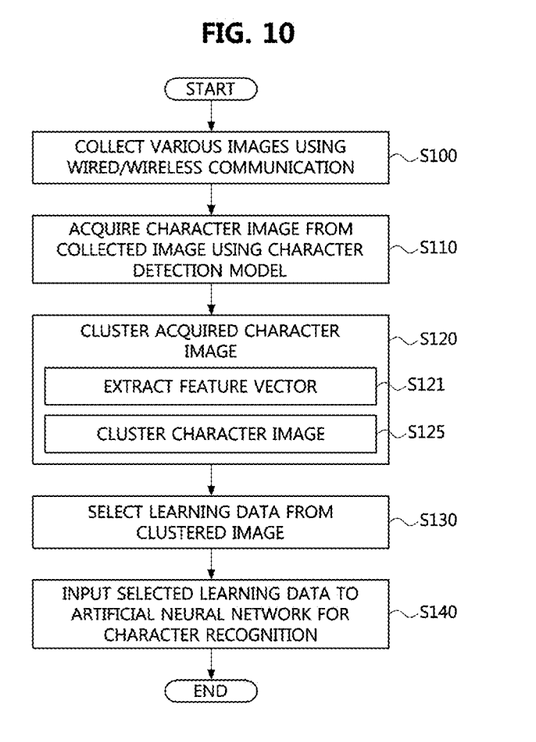
FIG. 10 is a flowchart of a learning data generation method needed to learn animation characters on the basis of deep learning according to an embodiment of the present invention.

FIG. 10 is a flowchart of a learning data generation method needed to learn animation characters on the basis of deep learning according to an embodiment of the present invention.

Referring to FIG. 10, the learning data generation method needed to learn animation characters on the basis of deep learning may include collecting various images from the outside using wired/wireless communication (S100), acquiring character images from the collected images using a character detection module (S110), clustering the acquired character images (S120), selecting learning data from among the clustered images (S130); and inputting the selected learning data to an artificial neural network for character recognition (S140).

The collecting of the various images (S100) may include collecting a video from the outside using the wired/wireless communication and extracting frames from the collected video at preset time intervals.

The learning data generation method may further include training the character detection module using the collected images after the collecting of the various images (S100). The training of the character detection module may include labeling the collected images to generate labels corresponding to the respective images and inputting the generated labels and the collected images to a preset character detection model to train the character detection model.

The character detection model may be one of YOLO, SSD, and Faster R-CNN.

Each of the labels may be a label conforming to DarkNet format and may include a class number, a start point coordinate ratio of a bounding box, and an aspect ratio of the bounding box.

The acquiring of the character images (S110) may include detecting a bounding-box-shaped character region from each of the collected images using the character detection model and preprocessing the detected character region to acquire the corresponding character image.

The preprocessing may include cutting the character region out of the corresponding collected image and normalizing the size of the cut character region.

The clustering (S120) may include extracting a feature vector from the character image (S121) and clustering the character image using the extracted feature vector (S125).

In more detail, the clustering of the character image (S125) may include adjusting the number of clusters according to a cluster determination strength value. The method of adjusting the number of clusters is the same as described with reference to 7, and thus a description thereof will be omitted.

The selecting of the learning data (S130) may include displaying representative images for a plurality of clusters to which the clustered image belongs to a user and selecting, as the learning data, a character image belonging to a cluster corresponding to an image selected by the user from among the displayed representative images.

Figure 11:
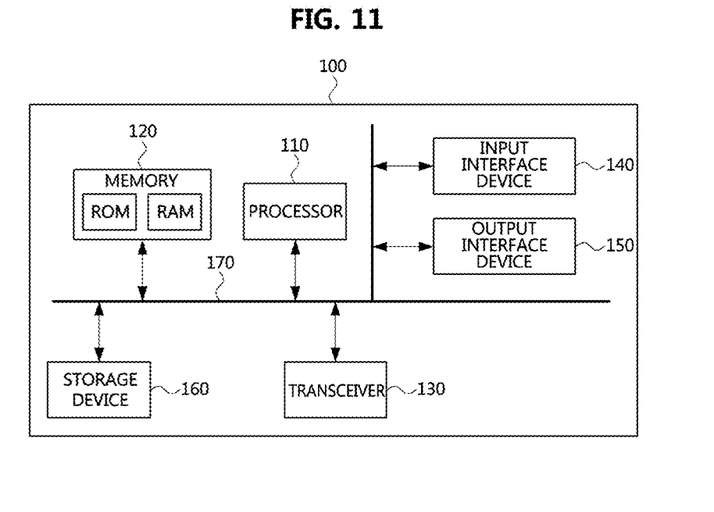
FIG. 11 is a hardware configuration diagram showing a learning data generation apparatus needed to learn animation characters on the basis of deep learning according to an embodiment of the present invention.

FIG. 11 is a hardware configuration diagram showing a learning data generation apparatus needed to learn an animated character on the basis of deep learning according to an embodiment of the present invention.

Referring to FIG. 11, a learning data generation apparatus 100 needed to learn animation characters on the basis of deep learning may include at least one processor 110 and a memory 120 configured to store instructions for instructing the at least one processor 110 to perform at least one operation.

Also, the learning data generation apparatus 100 needed to learn animation characters on the basis of deep learning may include a transceiver 130 configured to perform communication with a base station over a wired/wireless network. Also, the learning data generation apparatus 100 needed to learn animation characters on the basis of deep learning may further include an input interface device 140, an output interface device 150, a storage device 160, and the like. Elements included in the learning data generation apparatus 100 needed to learn animation characters on the basis of deep learning may be connected to each other by a bus 170 to perform communication with each other.

Here, the processor 110 may refer to a central processing unit (CPU), a graphics processing unit (GPU), or a dedicated processor for performing the methods according to embodiments of the present invention. Each of the memory 120 and the storage device 160 may include at least one of a volatile storage medium and a non-volatile storage medium. For example, the memory 120 may include at least one of a read-only memory (ROM) and a random access memory (RAM).

The at least one operation may include collecting various images from the outside using wired/wireless communication, acquiring character images from the collected images using a character detection module, clustering the acquired character images, selecting learning data from among the clustered images, and inputting the selected learning data to an artificial neural network for character recognition.

The collecting of the various images may include collecting a video from the outside using the wired/wireless communication and extracting frames from the collected video at preset time intervals.

The at least one operation may further include training the character detection module using the collected images after the collecting of the various images.

The training of the character detection module may include labeling the collected images to generate labels corresponding to the respective images and inputting the generated labels and the collected images to a preset character detection model to train the character detection model.

The character detection model may be one of YOLO, SSD, and Faster R-CNN.

Each of the labels may be a label conforming to DarkNet format and may include a class number, a start point coordinate ratio of a bounding box, and an aspect ratio of the bounding box.

The acquiring of the character images may include detecting a bounding-box-shaped character region from each of the collected images using the character detection model and preprocessing the detected character region to acquire the corresponding character image.

The preprocessing may include cutting the character region out of the corresponding collected image and normalizing the size of the cut character region.

The clustering may include extracting a feature vector from the character image and clustering the character image using the extracted feature vector.

The selecting of the learning data may include displaying representative images for a plurality of clusters to which the clustered image belongs to a user and selecting, as the learning data, a character image belonging to a cluster corresponding to an image selected by the user from among the displayed representative images.

Examples of the learning data generation apparatus needed to learn animation characters on the basis of deep learning may be a communication-enabled desktop computer, a laptop computer, a notebook, a smartphone, a tablet PC, a mobile phone, a smart watch, smart glasses, an e-book reader, a portable multimedia player (PMP), a portable game machine, a navigation device, a digital camera, a digital multimedia broadcasting (DMB) player, a digital audio recorder, a digital audio player, a digital video recorder, a digital video player, a personal digital assistant (PDA), etc.

The methods according to embodiments of the present invention may be implemented as program instructions executable by a variety of computer means and may be recorded on a computer-readable medium. The computer-readable medium may include, alone or in combination, program instructions, data files, data structures, and the like. The program instructions recorded on the computer-readable medium may be designed and configured specifically for the present invention or can be publicly known and available to those skilled in the field of computer software.

Examples of the computer-readable medium may include a hardware device such as ROM, RAM, and flash memory, which are specifically configured to store and execute the program instructions. Examples of the program instruction may include machine codes made by, for example, a compiler, as well as high-level language codes executable by a computer using an interpreter. The above hardware device can be configured to operate as at least one software module in order to perform the operation of the present invention, and vice versa.

Also, the above-described method or apparatus may be implemented by combining all or part of the configuration or function, or may be implemented separately.

By using the method and apparatus for generating learning data needed to learn animation characters on the basis of deep learning according to the present invention, it is possible to automatically generate appropriate learning data to train an artificial neural network for character recognition.

Also, since learning data most suitable for character recognition is generated, it is possible to improve a recognition rate.

While the present invention has been described with reference to exemplary embodiments, it will be understood by those skilled in the art that variations and modifications of the invention may be made without departing from the spirit and scope of the invention as defined by the appended claims.

What is claimed is:

1. A learning data generation method to learn animation characters on the basis of deep learning, the learning data generation method comprising:
    collecting various images from an external source using wired/wireless communication;
    training a character detection module using the collected images;
    acquiring character images from the collected images using the trained character detection module;
    clustering the acquired character images;
    selecting learning data from among the clustered images; and
    inputting the selected learning data to an artificial neural network for character recognition,
    wherein the training of the character detection module comprises:
        labeling the collected images to generate labels corresponding to the respective images; and
        inputting the generated labels and the collected images to a preset character detection model to train the character detection model.

2. The learning data generation method of claim 1, wherein the collecting of the various images comprises:
    collecting a video from the external source using the wired/wireless communication; and
    extracting frames from the collected video at preset time intervals.

3. The learning data generation method of claim 1, wherein each of the labels is a label conforming to DarkNet format and includes a class number, a start point coordinate ratio of a bounding box, and an aspect ratio of the bounding box.

4. The learning data generation method of claim 1, wherein the acquiring of the character images comprises:
    detecting a bounding-box-shaped character region from each of the collected images using the trained character detection model; and
    preprocessing the detected character region to acquire the corresponding character image.

5. The learning data generation method of claim 4, wherein the preprocessing comprises cutting the character region out of the corresponding collected image and normalizing the size of the cut character region.

6. The learning data generation method of claim 1, wherein the clustering comprises:
    extracting a feature vector from the character image; and
    clustering the character image using the extracted feature vector.

7. The learning data generation method of claim 6, wherein the clustering of the character image using the extracted feature vector comprises:
- clustering the character image;
- adjusting a cluster determination strength value according to the number of clusters generated by the clustering; and
- re-clustering the character image.

8. The learning data generation method of claim 7, wherein the adjusting of the cluster determination strength value comprises:
- increasing the cluster determination strength value when the number of clusters exceeds a maximal limit value within a preset limit range; and
- decreasing the cluster determination strength value when the number of clusters is less than an initial limit value within the limit range.

9. A learning data generation apparatus needed to learn animation characters on the basis of deep learning, the learning data generation apparatus comprising:
- at least one processor; and
- a memory configured to store instructions for instructing the at least one processor to perform at least one operation,
- wherein the at least one operation comprises:
- collecting various images from an external source using wired/wireless communication;
- training a character detection module using the collected images;
- acquiring character images from the collected images using the trained character detection module;
- clustering the acquired character images;
- selecting learning data from among the clustered images; and
- inputting the selected learning data to an artificial neural network for character recognition,
- wherein the training of the character detection module comprises:
  - labeling the collected images to generate labels corresponding to the respective images; and
  - inputting the generated labels and the collected images to a preset character detection model to train the character detection model.

10. The learning data generation apparatus of claim 9, wherein the collecting of the various images comprises:
- collecting a video from the external source using the wired/wireless communication; and
- extracting frames from the collected video at preset time intervals.

11. The learning data generation apparatus of claim 9, wherein the character detection model is one of You-Only-Look-Once (YOLO), Single Shot Detector (SSD), and Faster R-convolutional neural network (CNN).

12. The learning data generation apparatus of claim 9, wherein each of the labels is a label conforming to DarkNet format and includes a class number, a start point coordinate ratio of a bounding box, and an aspect ratio of the bounding box.

13. The learning data generation apparatus of claim 9, wherein the acquiring of the character images comprises:
- detecting a bounding-box-shaped character region from the collected image using the trained character detection model; and
- preprocessing the detected character region to acquire the character image.

14. The learning data generation apparatus of claim 13, wherein the preprocessing comprises cutting the character region out of the corresponding collected image and normalizing the size of the cut character region.

15. The learning data generation apparatus of claim 9, wherein the clustering comprises:
- extracting a feature vector from the character image; and
- clustering the character image using the extracted feature vector.

16. The learning data generation apparatus of claim 9, wherein the selecting of the learning data comprises:
- displaying, to a user, representative images for a plurality of clusters to which the clustered image belongs; and
- selecting, as the learning data, a character image belonging to a cluster corresponding to an image selected by the user from among the displayed representative images.

* * * * *